(12) United States Patent
Cheng (10) Patent No.: US 12,189,244 B2
(45) Date of Patent: Jan. 7, 2025

(54) MANUFACTURING METHOD OF LIQUID CRYSTAL DISPLAY PANEL AND LIQUID CRYSTAL DISPLAY PANEL

(71) Applicant: Wuhan China Star Optoelectronics Technology Co., Ltd., Hubei (CN)

(72) Inventor: Wei Cheng, Hubei (CN)

(73) Assignee: Wuhan China Star Optoelectronics Technology Co., Ltd., Hubei (CN)

( * ) Notice: Subject to any disclaimer, the term of this patent is extended or adjusted under 35 U.S.C. 154(b) by 329 days.

(21) Appl. No.: 16/500,719

(22) PCT Filed: Apr. 18, 2019

(86) PCT No.: PCT/CN2019/083313
§ 371 (c)(1),
(2) Date: Jul. 12, 2023

(87) PCT Pub. No.: WO2020/107777
PCT Pub. Date: Jun. 4, 2020

(65) Prior Publication Data
US 2023/0375871 A1    Nov. 23, 2023

(30) Foreign Application Priority Data
Nov. 28, 2018  (CN) .......................... 201811436803.6

(51) Int. Cl.
G02F 1/1341  (2006.01)
G02F 1/1335  (2006.01)
(Continued)

(52) U.S. Cl.
CPC ...... *G02F 1/1341* (2013.01); *G02F 1/133512* (2013.01); *G02F 1/133514* (2013.01); *G02F 1/133723* (2013.01); *G02F 1/13394* (2013.01)

(58) Field of Classification Search
None
See application file for complete search history.

(56) References Cited

U.S. PATENT DOCUMENTS

| | | | |
|---|---|---|---|
| 2009/0122240 A1* | 5/2009 | Lim | G02F 1/0136 349/106 |
| 2014/0063425 A1 | 3/2014 | Liou | |
| 2020/0166795 A1* | 5/2020 | Xiang | G02F 1/136209 |

FOREIGN PATENT DOCUMENTS

| | | |
|---|---|---|
| CN | 102854655 A | 1/2013 |
| CN | 105954920 A | 9/2016 |

(Continued)

*Primary Examiner* — Dung T Nguyen
(74) *Attorney, Agent, or Firm* — Taft Stettinius & Hollister LLP (57) ABSTRACT

The present invention provides a manufacturing method of a liquid crystal display (LCD) panel and the LCD panel. A thin film transistor (TFT) substrate and a color filter (CF) substrate are first bonded, a liquid crystal material is enclosed between the TFT and CF substrates to obtain a liquid crystal cell, which is then irradiated with ultraviolet light to obtain a functional liquid crystal layer, and finally a black matrix is formed on a side of the CF substrate away from the TFT substrate. By changing the structure of the existing LCD panel, the present invention prevents the shading of the black matrix that affects functional liquid crystal layer production. It is advantageous for a polymer liquid crystal technology, a self-aligned liquid crystal technology, and the like to realize a technique of forming a specific functional layer by irradiating the liquid crystal cell with ultraviolet light.

4 Claims, 5 Drawing Sheets

(51) Int. Cl.
*G02F 1/1337* (2006.01)
*G02F 1/1339* (2006.01)

(56) References Cited

FOREIGN PATENT DOCUMENTS

| | | |
|---|---|---|
| CN | 106707608 A | 5/2017 |
| CN | 108398821 A | 8/2018 |
| CN | 108873426 A | 11/2018 |
| CN | 109407390 A | 3/2019 |

* cited by examiner

MANUFACTURING METHOD OF LIQUID CRYSTAL DISPLAY PANEL AND LIQUID CRYSTAL DISPLAY PANEL

CROSS-REFERENCE TO RELATED APPLICATIONS

This application is a U.S. National Phase of International PCT Application No. PCT/CN2019/083313 filed Apr. 18, 2019, which claims the benefit of Chinese Patent Application Serial No. 201811436803.6 filed Nov. 28, 2018, the contents of each application are incorporated herein by reference in their entirety.

FIELD OF INVENTION

The present invention relates to the field of display technologies, and in particular, to a manufacturing method of a liquid crystal display panel and the liquid crystal display panel.

BACKGROUND OF INVENTION

Thin film transistor liquid crystal displays (TFT-LCDs) have many advantages such as thin body, power saving, and no radiation, and have been widely used. Most of the TFT-LCDs on the market are backlight type liquid crystal display devices, which include a liquid crystal display panel and a backlight module. The working principle of the liquid crystal display panel is to place liquid crystal molecules between two parallel glass substrates, control the orientation of liquid crystal molecules through applying electricity to the glass substrate or not, and refract light of the backlight module to produce a picture.

Generally, a liquid crystal display panel comprises of a color filter (CF) substrate, a thin film transistor (TFT) substrate, a liquid crystal (LC) disposed between the CF substrate and the TFT substrate, and a sealant frame. Wherein, the CF substrate primary includes a color filter layer that forms colored light through a color resist unit (R/G/B), a black matrix (BM) that prevents light leakage at pixel edges, and a post spacer (PS) for maintaining a thickness of a cell gap. In addition, an alignment film is further disposed on the TFT substrate and the CF substrate respectively. After the alignment film is in contact with the LC, the LC can orient to a pretilt angle in a certain direction, thereby providing a bearing angle to the liquid crystal molecules. Thus, the liquid crystal molecules are provided with the bearing angle (the magnitude of the pretilt angle has an important influence on driving voltage, contrast ratio, response time, viewing angle, etc. of the TFT-LCD).

At present, the materials of the alignment film are usually made of polyimide (PI) materials, which are primarily divided into a rubbed alignment type PI material and a photo-alignment type PI material. However, regardless of which PI alignment materials, they each have their own disadvantages. Wherein, the rubbed alignment type PI material forms an alignment film by rubbing alignment method. It is easy to cause problems that reduce process yields such as dust particles, static electricity, and brush marks during frictional alignment. The photo-alignment type PI material forms an alignment film by photo-alignment technology. Due to limited material properties, heat resistance and aging resistance are poor, and the ability to anchor LC is also weaker, thereby reducing the quality of the panel. In addition, the PI materials themselves have high polarity and high water absorption, storage and transportation easily facilitate deterioration, resulting in uneven phase distribution, and the PI material is expensive, and the process of forming a film on the TFT-LCD is rather complicated. This leads to an increase in panel costs.

With rapid development of the display industry, various display technologies are filling the market, and the major high-tech materials companies in the industry are also proposing more and more new technologies to be developed. For example, polymer wall liquid crystal technology and self-alignment liquid crystal (SA-LC) technology provide more possibilities for the development of display panels.

Among them, self-alignment LC can effectively solve problems of the above traditional PI alignment film. That is, a PI type alignment film is not required, but a polymerizable monomer additive having an alignment function is added to the liquid crystal system, and a polymer type alignment layer is formed at the interface between the liquid crystal layer and the glass substrate by photothermal effect such as ultraviolet light, which achieve the purpose of replacing the PI type alignment film. Compared with the conventional liquid crystal of the liquid crystal cell, the self-alignment liquid crystal cell directly adds an additive having an alignment function to the original liquid crystal composition, and does not require the PI system in the conventional process. As a result, the cost is greatly saved, the efficiency of the cell process is improved, and the PI machine and other related equipment are not needed, which has a good promotion effect on the further development of the liquid crystal display in the future.

Flexible display technology is one of the most active research directions in the field of electronic information in recent years. It has the characteristics of lightweight, flexible and foldable, and is usually used in mobile phones and electronic paper. For a flexible liquid crystal display, a liquid crystal material is required, and the liquid crystal material itself has fluidity. When the substrate is bent, the liquid crystal material flows due to uneven pressure, thereby causing problems such as poor alignment of the liquid crystal material and light leakage. At this time, polymer wall liquid crystal can effectively solve the above problems. The polymer wall liquid crystal is added with polymerizable monomers and a photoinitiator compared with the conventional liquid crystal material. After the completion of the process of fabricating a cell, the photoinitiator doped in the liquid crystal layer is activated to generate free radicals under irradiation of ultraviolet light. These free radicals in turn initiate free radical polymerization of the polymer monomer molecules doped in the liquid crystal. By controlling the area irradiated with the ultraviolet light, the polymer gradually grows to be separated from the liquid crystal molecules, thereby forming a polymer wall at a specific position to limit the flow of the liquid crystal material, and then realizing flexible liquid crystal display.

Although the above polymer wall liquid crystal technology and self-alignment liquid crystal technology have been proposed for a long time, they are faced with many difficulties in practical applications. Taking self-alignment liquid crystal as an example, LCD manufacturers have already conducted preliminary tests on a transparent test cell. Actually, on the existing LCD display, due to the metal trace and the opaqueness of the BM, when the ultraviolet light is irradiated to form the polymer alignment layer, the polymerizable monomer additive cannot form an aligned polymer alignment layer in areas where ultraviolet light is blocked.

Figure 1:
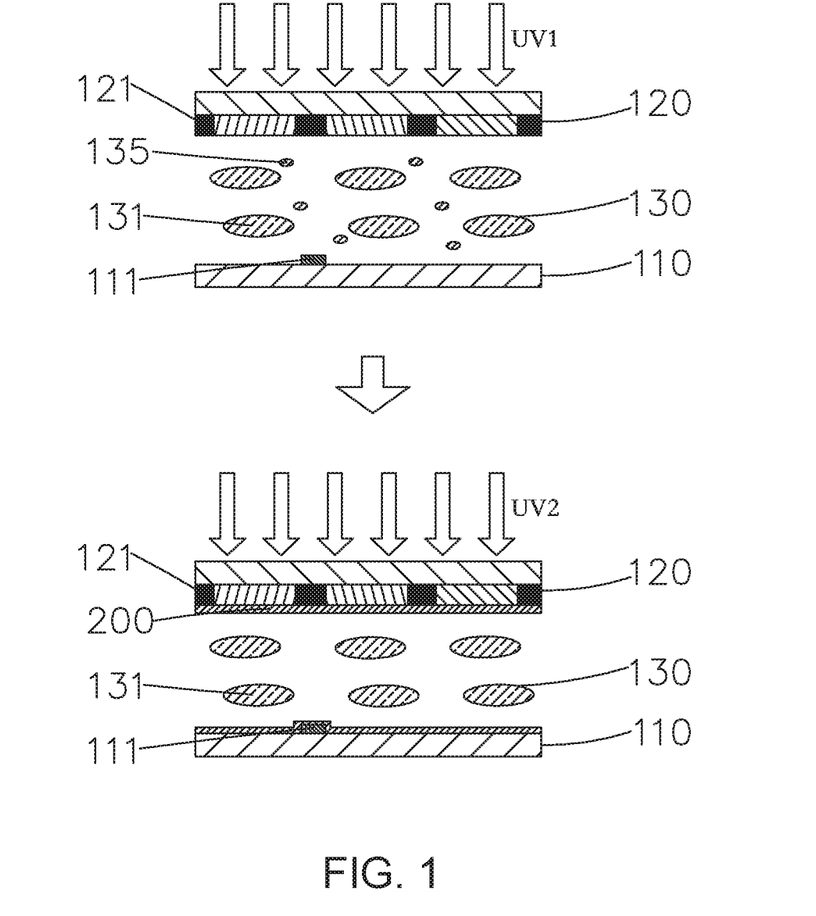
FIG. 1 is a schematic view of a conventional self-aligned liquid crystal technology.

The currently developed SA-LC technology is shown in FIG. 1. After filling the liquid crystal cell pair with the self-aligned liquid crystal composition, the liquid crystal cell is heated to a clearing point temperature (Tni) and stabilized for a period of time, and then it is irradiated with polarized ultraviolet light (UV1). A polymerizable monomer additive 135 forms a polymer type alignment layer (SA-layer) 200 on the side facing a TFT substrate 110 and a CF substrate 120, and then ultraviolet light (UV2) is irradiated to stabilize the entire liquid crystal cell system 100. Due to the light shielding property of a metal trace 111 on the TFT substrate 110 and a black matrix 121 on the CF substrate 120, the UV1 cannot reach a liquid crystal layer 130 corresponding to the metal trace 111 and the black matrix 121 to form a stable polymer type alignment layer 200 on the opposite surface of the entire TFT substrate 110 and the CF substrate 120. When liquid crystal molecules 131 are disorderly arranged in this area, the display screen is not effective, and display defects such as light leakage occur.

SUMMARY OF INVENTION

An object of the present invention is to provide a manufacturing method of a liquid crystal display (LCD) panel, which can avoid the influence of the light shielding property of the black matrix on the production of the functional liquid crystal layer. It is beneficial to the realization of the technology of polymer liquid crystal technology, self-aligned liquid crystal technology, etc., which need to irradiate the liquid crystal cell to form a specific functional layer.

An object of the present invention is further to provide a liquid crystal display panel, which can avoid the influence of the light shielding property of the black matrix on the production of the functional liquid crystal layer. It is beneficial to the realization of the technology of polymer liquid crystal technology, self-aligned liquid crystal technology, etc., which need to irradiate the liquid crystal cell to form a specific functional layer.

In order to achieve the above object, the present invention provides a manufacturing method of a liquid crystal display panel. The manufacturing method comprises the following steps:

step S1, providing a thin film transistor (TFT) substrate, a color filter (CF) substrate, and a liquid crystal material;
wherein the liquid crystal material comprises liquid crystal molecules and reactive monomers;
step S2, dropping the liquid crystal material on the TFT substrate or the CF substrate, bonding the TFT substrate and the CF substrate, and sealing the liquid crystal material between the TFT substrate and the CF substrate to obtain a liquid crystal cell;
step S3, irradiating the liquid crystal cell with ultraviolet light, and reacting the reactive monomers in the liquid crystal material under irradiation of ultraviolet light to obtain a functional liquid crystal layer; and
step S4, forming a black matrix on a side of the CF substrate away from the TFT substrate.

The liquid crystal material provided in the step S1 is a self-aligning liquid crystal material;
in the step S3, the liquid crystal cell is irradiated from the TFT substrate side and the CF substrate side of the liquid crystal cell by using polarized ultraviolet light, respectively, and the reactive monomers are polymerized under irradiation of polarized ultraviolet light to form two self-aligning layers on opposite sides of the TFT substrate and the CF substrate respectively; and
the functional liquid crystal layer comprises the two self-aligning layers, and a liquid crystal molecular layer disposed between the two self-aligning layers The liquid crystal material provided in the step S1 is a polymer wall liquid crystal material;
in the step S3, the method further comprises: providing a photomask, placing the photomask on the liquid crystal cell before irradiating ultraviolet light, and then irradiating the liquid crystal cell from above the photomask using ultraviolet light, wherein the ultraviolet light that passes through a light transmitting portion of the photomask is irradiated on the liquid crystal material in the liquid crystal cell to form an ultraviolet light irradiation area, and the reactive monomers are polymerized in the ultraviolet light irradiation area to form a plurality of polymer walls having upper and lower ends that are respectively connected to the TFT substrate and the CF substrate; and
the functional liquid crystal layer comprises the polymer walls and a liquid crystal molecular layer separated into a plurality of area by the polymer walls.

The step S3 further comprises: heating the liquid crystal cell before the irradiating ultraviolet light, so that the liquid crystal material in the liquid crystal cell reaches a clearing point temperature; and
the step S4 further comprises: forming a transparent conductive layer to cover a black matrix over a side of the CF substrate away from the TFT substrate.

The TFT substrate provided in the step S1 comprises a first substrate and a metal trace disposed on the first substrate; and
the CF substrate comprises a second substrate and a plurality of color blocks disposed on the second substrate and arranged in an array.

The present invention further provides a liquid crystal display (LCD) panel. The LCD panel comprises a thin film transistor (TFT) substrate and a color filter (CF) substrate disposed opposite to each other, a functional liquid crystal layer disposed between the TFT substrate and the CF substrate, and a black matrix disposed on a side of the CF substrate away from the TFT substrate; and
the functional liquid crystal layer is made of a liquid crystal material, and the liquid crystal material comprises liquid crystal molecules and reactive monomers capable of undergoing a polymerization under irradiation of ultraviolet light.

The liquid crystal material is a self-aligning liquid crystal material;
the functional liquid crystal layer comprises two self-aligning layers respectively disposed on opposite sides of the TFT substrate and the CF substrate, and a liquid crystal molecular layer disposed between the two self-aligning layers; and
the two self-aligning layers are formed by the polymerization of the reactive monomers in the liquid crystal material under irradiation of polarized ultraviolet light.

The liquid crystal material is a polymer wall liquid crystal material;
the functional liquid crystal layer comprises the polymer walls having upper and lower ends that are respectively connected to the TFT substrate and the CF substrate, and a liquid crystal molecular layer separated into a plurality of areas by the polymer walls; and
the polymer walls are formed by the polymerization of the reactive monomers in the liquid crystal material under the irradiation of the ultraviolet light.

The LCD panel further comprises a transparent conductive layer covering the black matrix on an entire side of the CF substrate away from the TFT substrate.

The TFT substrate comprises a first substrate and a metal trace disposed on the first substrate; and the CF substrate comprises a second substrate and a plurality of color blocks disposed on the second substrate and arranged in an array.

The beneficial effects of the invention: In the manufacturing method of the LCD panel of the present invention, a TFT substrate and a CF substrate are first bonded together, and a liquid crystal material is enclosed between the TFT substrate and the CF substrate to obtain a liquid crystal cell. Then, the liquid crystal cell is irradiated by ultraviolet light, and the reactive monomers in the liquid crystal material is polymerized under ultraviolet light to obtain a functional liquid crystal layer. Finally, a black matrix is formed on a side of the CF substrate away from the TFT substrate. By changing the structure of the existing liquid crystal display panel, the black matrix is formed on the side of the CF substrate away from the TFT substrate, and the liquid crystal cell is irradiated with ultraviolet light before the black matrix is fabricated, thereby avoiding the shading of the black matrix to affect the functional liquid crystal layer. Therefore, it is advantageous for a polymer liquid crystal technology, a self-aligned liquid crystal technology, and the like to realize a technique of forming a specific functional layer by irradiating a liquid crystal cell with ultraviolet light. In the LCD panel of the present invention, the black matrix is disposed on the side of the CF substrate away from the TFT substrate. Therefore, in the process of manufacturing the liquid crystal display panel, the liquid crystal material in the liquid crystal cell can be irradiated with ultraviolet light before the black matrix is fabricated, thereby avoiding the shading of the black matrix to affect the functional liquid crystal layer. Therefore, it is advantageous for a polymer liquid crystal technology, a self-aligned liquid crystal technology, and the like to realize a technique of forming a specific functional layer by irradiating a liquid crystal cell with ultraviolet light.

DESCRIPTION OF DRAWINGS

In order to further understand the features and technical details of the present invention, please refer to the following detailed description and drawings regarding the present invention. The drawings are provided for reference and description only and are not intended to limit the present invention.

In the drawings.

DETAILED DESCRIPTION OF PREFERRED EMBODIMENTS

In order to further clarify the technical means and effects of the present invention, the following detailed description will be made in conjunction with the preferred embodiments of the invention and the accompanying drawings.

Figure 2:
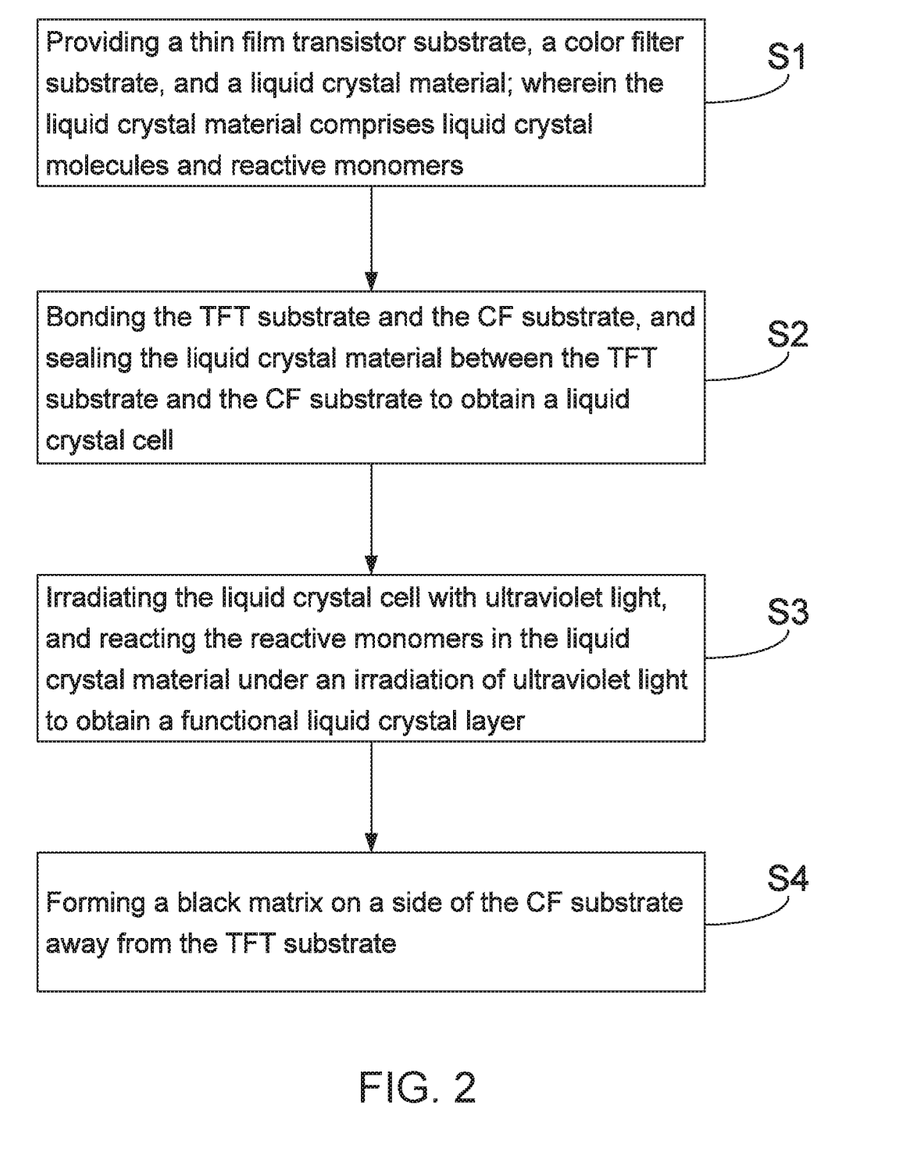
FIG. 2 is a schematic flow chart of a manufacturing method of a liquid crystal display (LCD) panel of the present invention.

Referring to FIG. 2, the present invention first provides a manufacturing method of a liquid crystal display (LCD) panel. The first embodiment of the manufacturing method of the LCD panel of the present invention specifically comprises the following steps:

Step S1: Providing a thin film transistor (TFT) substrate 10, a color filter (CF) substrate 20, and a liquid crystal material.

Specifically, the TFT substrate 10 provided in the step S1 comprises a first substrate 11 and a metal trace 12 disposed on the first substrate 11.

Specifically, the CF substrate 20 comprises a second substrate 21 and a plurality of color blocks 22 disposed on the second substrate 21 and arranged in an array. The color blocks 22 include red color blocks, green color blocks, and blue color blocks disposed in sequence. Of course, the color blocks 12 may further include color blocks with other colors, such as yellow color blocks. It should be noted that, in the step S1, there is no need to dispose a black matrix on the CF substrate 20.

Specifically, the liquid crystal material comprises liquid crystal molecules 31 and reactive monomers 32.

Further, the liquid crystal material provided in the step S1 is a self-aligning liquid crystal material, and the reactive monomer 32 is a polymerizable monomer additive having an alignment function.

Figure 3:
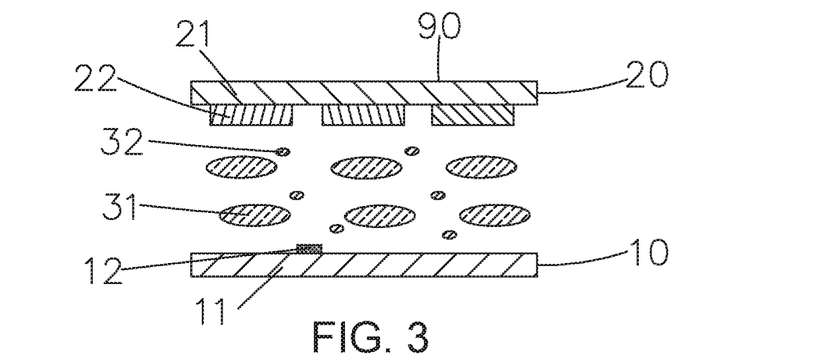
FIG. 3 is a schematic view of step S2 of the manufacturing method of the LCD panel of the present invention.

Step S2: As shown in FIG. 3, dropping the liquid crystal material on the TFT substrate 10 or the CF substrate 20, bonding the TFT substrate 10 and the CF substrate 20, and sealing the liquid crystal material between the TFT substrate 10 and the CF substrate 20 to obtain a liquid crystal cell 90.

Figure 4:
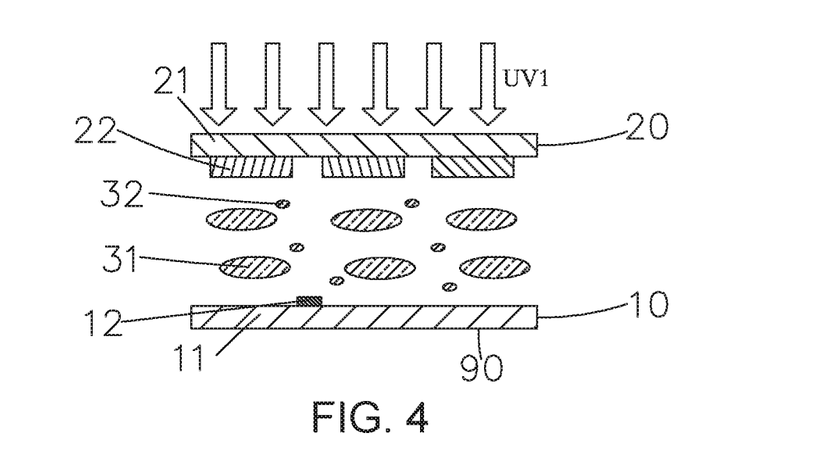
FIGS. 4-5 are schematic views of step S3 of the first embodiment of the manufacturing method of the LCD panel of the present invention.
Figure 5:
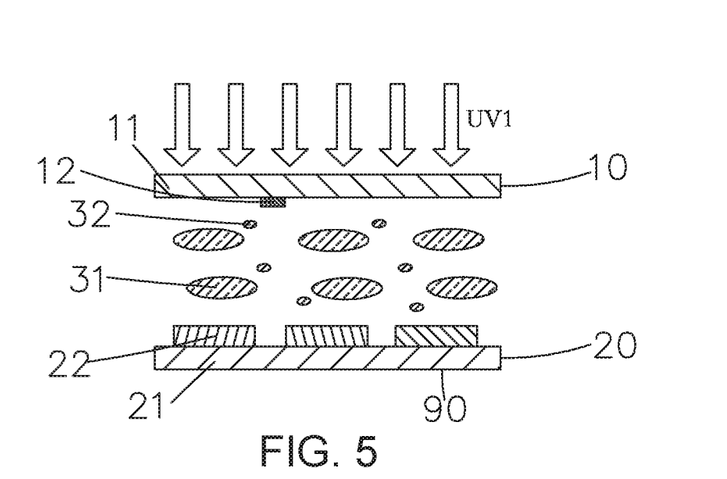

Step S3: As shown in FIGS. 4-5, heating the liquid crystal cell 90 so that the liquid crystal material in the liquid crystal cell 90 reaches a clearing point temperature. Then, the liquid crystal cell 90 is irradiated from a side of the TFT substrate 10 and a side of the CF substrate 20 of the liquid crystal cell 90 with polarized ultraviolet light (UV1), respectively, and the reactive monomers 32 are polymerized under irradiation of polarized ultraviolet light to form two self-aligning layers 35 on the opposite side of the TFT substrate 10 and the CF substrate 20, respectively, and a functional liquid crystal layer 30 including the two self-aligning layers 35 and a liquid crystal molecular layer 33 disposed between the two self-aligning layers 35 is obtained.

Figure 6:
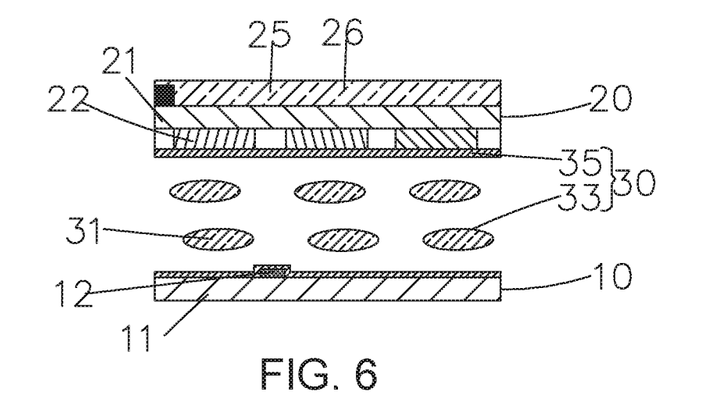
FIG. 6 is a schematic view of step S4 of the first embodiment of the manufacturing method of the LCD panel of the present invention.

Step S4: As shown in FIG. 6, forming a black matrix 25 on a side of the CF substrate 20 away from the TFT substrate 10, and forming a transparent conductive layer 26 covering the black matrix 25 on an entire side of the CF substrate 20 away from the TFT substrate 10.

Specifically, the material of the transparent conductive layer 26 is indium tin oxide (ITO) for preventing static electricity generation of the liquid crystal display panel.

In the first embodiment of the manufacturing method of the LCD panel of the present invention, the TFT substrate 10 and the CF substrate 20 are first bonded together, and the liquid crystal material is enclosed between the TFT substrate 10 and the CF substrate 20 to obtain the liquid crystal cell 90. Then, the liquid crystal cell 90 is irradiated twice with ultraviolet light, and the reactive monomers 32 are polymerized under ultraviolet light to form two self-aligning layers 35 on opposite sides of the TFT substrate 10 and the CF substrate 20, respectively. Finally, the black matrix 25 is formed on the side of the CF substrate 20 away from the TFT substrate 10. By changing the structure of the existing liquid crystal display panel, the black matrix 25 is formed on the side of the CF substrate 20 away from the TFT substrate 10, and the liquid crystal cell 90 is irradiated twice with ultraviolet light before the black matrix 25 is fabricated, thereby preventing the shading of the black matrix 25 that affects the production of the self-aligning layers 35. As a result, the self-aligning layer 35 having uniform orientation can be obtained, thereby effectively improving the alignment uniformity of the liquid crystal display panel, improving the display effect, and reducing the risk of light leakage.

In the second embodiment of the manufacturing method of the LCD panel of the present invention, the LCD panel is a flexible LCD panel, and the embodiment specifically includes the following steps:

Step S1: Providing a TFT substrate 10, a CF substrate 20, and a liquid crystal material.

Specifically, the TFT substrate 10 provided in the step S1 comprises a first substrate 11 and a metal trace 12 disposed on the first substrate 11.

Specifically, the CF substrate 20 comprises a second substrate 21 and a plurality of color blocks 22 disposed on the second substrate 21 and arranged in an array. The color blocks 22 include red color blocks, green color blocks, and blue color blocks disposed in sequence. Of course, the color blocks 12 may further include color blocks with other colors, such as yellow color blocks. It should be noted that, the black matrix is not disposed on the CF substrate 20 provided in the step S1.

Specifically, the liquid crystal material comprises liquid crystal molecules 31 and reactive monomers 32.

Further, the liquid crystal material provided in the step S1 is a polymer wall liquid crystal material.

Specifically, the first substrate 11 and the second substrate 21 are both flexible substrates.

Step S2: Dropping the liquid crystal material on the TFT substrate 10 or the CF substrate 20, bonding the TFT substrate 10 and the CF substrate 20, and sealing the liquid crystal material between the TFT substrate 10 and the CF substrate 20 to obtain a liquid crystal cell 90.

Figure 7:
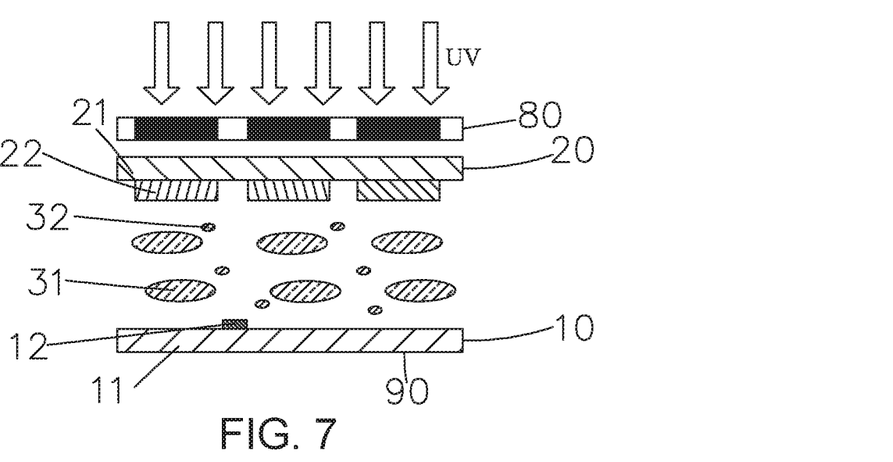
FIG. 7 is a schematic view of step S3 of the second embodiment of the manufacturing method of the LCD panel of the present invention.

Step S3: As shown in FIG. 7, providing a reticle 80, placing the reticle 80 over the liquid crystal cell 90, and then irradiating the liquid crystal cell 90 from above the reticle 80 using ultraviolet light. Ultraviolet light is irradiated on the liquid crystal material in the liquid crystal cell 90 through the light transmitting portion of the reticle 80 to form an ultraviolet light irradiation area. The reactive monomers 32 are polymerized in the ultraviolet light irradiation area to form a plurality of polymer walls 36 respectively connected to the TFT substrate 10 and the CF substrate 20 at the upper and lower ends, thereby obtaining a functional liquid crystal layer 30 including the polymer walls 36 and a liquid crystal molecular layer 33 separated into a plurality of areas by the polymer walls 36.

Figure 8:
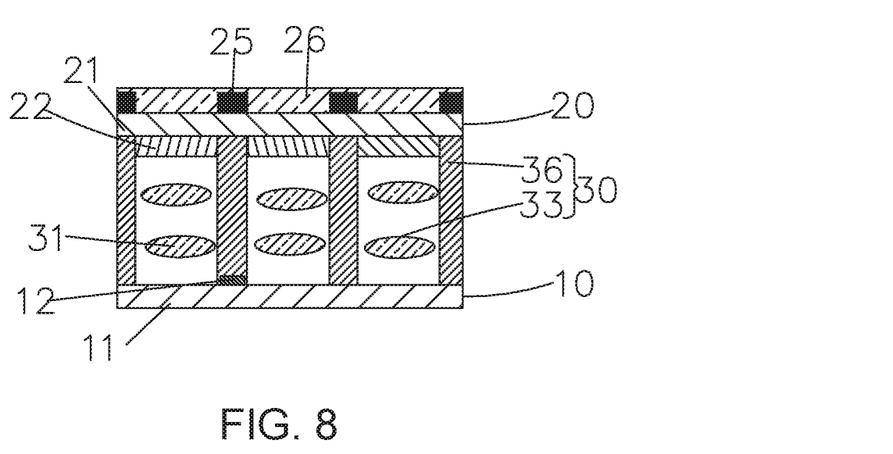
FIG. 8 is a schematic view of step S4 of the second embodiment of the manufacturing method of the LCD panel of the present invention.

Step S4: As shown in FIG. 8, forming a black matrix 25 on a side of the CF substrate 20 away from the TFT substrate 10, and forming a transparent conductive layer 26 covering the black matrix 25 on an entire side of the CF substrate 20 away from the TFT substrate 10.

Specifically, the material of the transparent conductive layer 26 is ITO for preventing static electricity generation of the liquid crystal display panel.

In the first embodiment of the manufacturing method of the LCD panel of the present invention, the TFT substrate 10 and the CF substrate 20 are first bonded together, and the liquid crystal material is enclosed between the TFT substrate 10 and the CF substrate 20 to obtain the liquid crystal cell 90. Then, the liquid crystal cell 90 is irradiated with ultraviolet light, and the reactive monomers 32 in the liquid crystal material are polymerized under ultraviolet light to form a plurality of polymer walls 36 respectively connected to the TFT substrate 10 and the CF substrate 20 at the upper and lower ends. Finally, the black matrix 25 is formed on a side of the CF substrate 20 away from the TFT substrate 10. By changing the structure of the existing liquid crystal display panel, the black matrix 25 is formed on a side of the CF substrate 20 away from the TFT substrate 10, thereby preventing the shading of the black matrix 25 that affects the production of the polymer walls 36. As a result, the polymer walls 36 capable of effectively restricting the flow of the liquid crystal molecules 31 can be obtained, and thus can effectively avoid poor alignment, light leakage, etc., which are caused by panel bending.

Based on the same inventive concept, the present invention also provides a LCD panel. The LCD panel comprises a thin film transistor (TFT) substrate 10 and a color filter (CF) substrate 20 disposed opposite to each other, a functional liquid crystal layer 30 disposed between the TFT substrate 10 and the CF substrate 20, a black matrix 25 disposed on a side of the CF substrate 20 away from the TFT substrate 10, and a transparent conductive layer 26 covering the black matrix 25 on an entire side of the CF substrate 20 away from the TFT substrate 10.

The functional liquid crystal layer 30 is made of a liquid crystal material, and the liquid crystal material comprises liquid crystal molecules 31 and reactive monomers 32 capable of undergoing polymerization under irradiation of ultraviolet light.

Specifically, the TFT substrate 10 comprises a first substrate 11 and a metal trace 12 disposed on the first substrate 11.

Specifically, the CF substrate 20 comprises a second substrate 21 and a plurality of color blocks 22 disposed on the second substrate 21 and arranged in an array.

Illustratively, the liquid crystal material is a self-aligning liquid crystal material. The functional liquid crystal layer 30 comprises two self-aligning layers 35 respectively disposed on opposite sides of the TFT substrate 10 and the CF substrate 20, and a liquid crystal molecular layer 33 disposed between the two self-aligning layers 35. The two self-aligning layers 35 are formed by the polymerization of the reactive monomers 32 in the liquid crystal material under irradiation of polarized ultraviolet light.

Alternatively, the liquid crystal material may also be a polymer wall liquid crystal material. The functional liquid crystal layer 30 comprises a plurality of polymer walls 36 having upper and lower ends that are respectively connected to the TFT substrate 10 and the CF substrate 20, and a liquid crystal molecular layer 33 separated into a plurality of areas by the polymer walls 36. The polymer walls 36 are formed by the polymerization of the reactive monomers 32 in the liquid crystal material under the irradiation of the ultraviolet light. When the LCD panel is a flexible display panel, and the first substrate 11 and the second substrate 21 are both flexible substrates, the polymer walls 36 capable of effectively restricting the flow of the liquid crystal molecules 31 can be obtained, and thus can effectively avoid poor alignment, light leakage, etc., which are caused by panel bending.

In the LCD panel of the present invention, compared with prior art, the black matrix 25 is disposed on the side of the CF substrate 20 away from the TFT substrate 10, and the liquid crystal cell is irradiated with ultraviolet light before the black matrix 25 is fabricated, thereby preventing the shading of the black matrix 25 that affects the production of the functional liquid crystal layer 30. Therefore, it is advantageous for a polymer liquid crystal technology, a self-aligned liquid crystal technology, and the like to realize a technique of forming a specific functional layer by irradiating a liquid crystal cell with ultraviolet light.

In summary, in the manufacturing method of the LCD panel of the present invention, the TFT substrate and the CF substrate are first bonded together, and the liquid crystal material is enclosed between the TFT substrate and the CF substrate to obtain the liquid crystal cell. Then, the liquid crystal cell is irradiated with ultraviolet light, and the reactive monomers in the liquid crystal material is polymerized under ultraviolet light to obtain the functional liquid crystal layer. Finally, the black matrix is formed on a side of the CF substrate away from the TFT substrate. By changing the structure of the existing liquid crystal display panel, the black matrix is formed on a side of the CF substrate away from the TFT substrate, and the liquid crystal cell is irradiated with ultraviolet light before the black matrix is fabricated, thereby preventing the shading of the black matrix that affects the production of the functional liquid crystal layer. Therefore, it is advantageous for the polymer liquid crystal technology, the self-aligned liquid crystal technology, and the like to realize a technique of forming the specific functional layer by irradiating the liquid crystal cell with ultraviolet light. In the LCD panel of the present invention, the black matrix is disposed on a side of the CF substrate away from the TFT substrate. Therefore, in the process of manufacturing the liquid crystal display panel, the liquid crystal material in the liquid crystal cell can be irradiated with ultraviolet light before the black matrix is fabricated, thereby preventing the shading of the black matrix to affect the functional liquid crystal layer. Therefore, it is advantageous for the polymer liquid crystal technology, the self-aligned liquid crystal technology, and the like to realize the technique of forming the specific functional layer by irradiating a liquid crystal cell with ultraviolet light.

In the above, various other corresponding changes and modifications can be made according to the technical solutions and technical ideas of the present invention to those skilled in the art, and all such changes and modifications are within the scope of the claims of the present invention.

What is claimed is:

1. A manufacturing method of a liquid crystal display (LCD) panel, comprising the following steps:
   step S1, providing a thin film transistor (TFT) substrate, a color filter (CF) substrate, and a liquid crystal material;
   wherein the liquid crystal material comprises liquid crystal molecules and reactive monomers;
   step S2, dropping the liquid crystal material on the TFT substrate or the CF substrate, bonding the TFT substrate and the CF substrate, and sealing the liquid crystal material between the TFT substrate and the CF substrate to obtain a liquid crystal cell;
   step S3, irradiating the liquid crystal cell with ultraviolet light, and reacting the reactive monomers in the liquid crystal material under irradiation of ultraviolet light to obtain a functional liquid crystal layer;
   heating the liquid crystal cell before irradiating ultraviolet light, so that the liquid crystal material in the liquid crystal cell reaches a clearing point temperature; and
   step S4, forming a black matrix on a side of the CF substrate away from the TFT substrate; and
   forming a transparent conductive layer to cover a black matrix over a side of the CF substrate away from the TFT substrate.

2. The manufacturing method of the LCD panel as claimed in claim 1, wherein the liquid crystal material provided in the step S1 is a self-aligning liquid crystal material;
   in the step S3, the liquid crystal cell is irradiated from the TFT substrate side and the CF substrate side of the liquid crystal cell by using polarized ultraviolet light, respectively, and the reactive monomers are polymerized under irradiation of polarized ultraviolet light to form two self-aligning layers on opposite sides of the TFT substrate and the CF substrate respectively; and
   the functional liquid crystal layer comprises the two self-aligning layers, and a liquid crystal molecular layer disposed between the two self-aligning layers.

3. The manufacturing method of the LCD panel as claimed in claim 1, wherein the liquid crystal material provided in the step S1 is a polymer wall liquid crystal material;
   in the step S3, the method further comprises: providing a photomask, placing the photomask on the liquid crystal cell before irradiating ultraviolet light, and then irradiating the liquid crystal cell from above the photomask using ultraviolet light, wherein the ultraviolet light that passes through a light transmitting portion of the photomask is irradiated on the liquid crystal material in the liquid crystal cell to form an ultraviolet light irradiation area, and the reactive monomers are polymerized in the ultraviolet light irradiation area to form a plurality of polymer walls having upper and lower ends that are respectively connected to the TFT substrate and the CF substrate; and
   the functional liquid crystal layer comprises the polymer walls and a liquid crystal molecular layer separated into a plurality of area by the polymer walls.

4. The manufacturing method of the LCD panel as claimed in claim 1, wherein the TFT substrate provided in the step S1 comprises a first substrate and a metal trace disposed on the first substrate; and
   the CF substrate comprises a second substrate and a plurality of color blocks disposed on the second substrate and arranged in an array.

* * * * *